(12) United States Patent
Vexler et al.

(10) Patent No.: US 11,715,330 B2
(45) Date of Patent: Aug. 1, 2023

(54) LIVENESS DETECTION IN AN INTERACTIVE VIDEO SESSION

(71) Applicant: NEC Corporation Of America, Herzlia (IL)

(72) Inventors: Mark Vexler, Hod-HaSharon (IL); Liran Orevi, Rishon-LeZion (IL); Yaacov Hoch, Ramat-Gan (IL); Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 204 days.

(21) Appl. No.: 17/136,053

(22) Filed: Dec. 29, 2020

(65) Prior Publication Data

US 2022/0207263 A1    Jun. 30, 2022

(51) Int. Cl.
| | |
|---|---|
| G06V 40/16 | (2022.01) |
| G06N 20/00 | (2019.01) |
| G06V 10/60 | (2022.01) |
| G06V 20/40 | (2022.01) |
| G06V 40/40 | (2022.01) |
| G06V 10/82 | (2022.01) |

(52) U.S. Cl.
CPC ........... *G06V 40/176* (2022.01); *G06N 20/00* (2019.01); *G06V 10/60* (2022.01); *G06V 10/82* (2022.01); *G06V 20/46* (2022.01); *G06V 40/171* (2022.01); *G06V 40/172* (2022.01); *G06V 40/45* (2022.01)

(58) Field of Classification Search
CPC ...... G06V 40/176; G06V 10/60; G06V 10/82; G06V 20/46; G06V 40/171; G06V 40/172; G06V 40/45; G06V 40/74; G06N 20/00

See application file for complete search history.

(56) References Cited

U.S. PATENT DOCUMENTS

| 10,546,183 | B2 * | 1/2020 | Rodriguez | G06V 40/45 |
|---|---|---|---|---|
| 2013/0015946 | A1 * | 1/2013 | Lau | G06V 10/422 340/5.2 |
| 2017/0308739 | A1 * | 10/2017 | Wang | G06V 40/40 |
| 2018/0060680 | A1 * | 3/2018 | Alon | G06F 21/32 |
| 2018/0260643 | A1 * | 9/2018 | Sheikh Faridul | G06T 7/251 |
| 2020/0036528 | A1 * | 1/2020 | Ortiz | H04L 63/123 |

(Continued)

OTHER PUBLICATIONS

Fourati E, Elloumi W, Chetouani A. Anti-spoofing in face recognition-based biometric authentication using image quality assessment. Multimedia Tools and Applications. Jan. 2020;79(1):865-89. (Year: 2020).*

*Primary Examiner* — Edward F Urban
*Assistant Examiner* — Wassim Mahrouka

(57) ABSTRACT

Disclosed herein are methods and systems for determining whether a user engaged in an interactive video session is a genuine user or a potential impersonator by analyzing a plurality of consecutive images depicting the user while engaged in the video session to identify one or more dynamic facial patterns in the face of the user while his lips are moving. Each such dynamic facial pattern may express a movement of one or more of a plurality of wrinkles and/or other dynamic facial features (e.g., nostrils, distance between nostrils, ear, skin portion, muscle, etc.) in the face of the user. The user may be then determined to be genuine or not based on a comparison between the identified dynamic facial pattern(s) and one or more reference dynamic facial patterns.

16 Claims, 4 Drawing Sheets

(56) References Cited

U.S. PATENT DOCUMENTS

2020/0110863 A1* 4/2020 Zhang ................. H04L 63/0861
2021/0233031 A1* 7/2021 Preuss ...................... G09B 7/02
2022/0163650 A1* 5/2022 Min ........................ G08C 17/02

* cited by examiner

LIVENESS DETECTION IN AN INTERACTIVE VIDEO SESSION

FIELD AND BACKGROUND OF THE INVENTION

The present invention, in some embodiments thereof, relates to detecting whether a user engaged in a video session is genuine or not, and, more specifically, but not exclusively, to detecting whether a user engaged in a video session is genuine or not based on analysis of dynamic facial features of the user.

Video session, for example, video conferences, video chats, video authentication sessions and/or the like have become highly popular in recent time with the advancement of technology, specifically, advanced video protocols, high network availability, increased computing power and more.

Another major contributor to the constantly increasing demand for video sessions is the fact that many human interactions have been replaced by such video sessions, for example, work sessions, educational sessions, social activities and many more. This trend has significantly expanded under the constraints imposed during the COVID-19 epidemic during which travel and mobility of large segments of the population is highly limited.

However, while the video session may allow for direct, easy and immediate interaction, such interaction may be exposed to potential malicious parties which may impersonate as users engaged in video sessions in attempt to deceive the other user(s) engaged in the video sessions for one or more malicious goals.

SUMMARY OF THE INVENTION

According to a first aspect of the present invention there is provided a computer implemented method of determining whether a user engaged in an interactive video session is genuine, comprising using one or more processors for:
  Receiving a sequence of consecutive images captured by one or more imaging sensors configured to depict at least a face of a user engaged in a video session while the user moves his lips.
  Analyzing at least some of the images of the sequence to identify one or more dynamic facial patterns of the user while his lips are moving. The one or more dynamic facial pattern expressing a movement of one or more of a plurality of wrinkles in the face of the user.
  Determining whether the user is genuine or an impersonator based on a comparison between the identified dynamic facial pattern(s) of the user and one or more reference dynamic facial patterns.
  Outputting an indication of whether the user is genuine or not based on the determination.

According to a second aspect of the present invention there is provided a system for determining whether a user engaged in an interactive video session is genuine, comprising one or more processors configured to execute a code. The code comprising:
  Code instruction to receive a sequence of consecutive images captured by one or more imaging sensors configured to depict at least a face of a user engaged in a video session while the user moves his lips
  Code instruction to analyze at least some of the images of the sequence to identify one or more dynamic facial pattern of the user while his lips are moving. The one or more dynamic facial patterns expressing a movement pattern of one or more of a plurality of wrinkles in the face of the user.
  Code instruction to determine whether the user is genuine or an impersonator based on a comparison between one or more of the identified dynamic facial patterns of the user and one or more reference dynamic facial patterns.
  Code instruction to output an indication of whether the user is genuine or not based on the determination.

According to a third aspect of the present invention there is provided a computer program product comprising program instructions executable by a computer, which, when executed by the computer, cause the computer to perform a method according to the first aspect.

In a further implementation form of the first, second and/or third aspects, the impersonator uses a mask to impersonate as the user during the video session.

In a further implementation form of the first, second and/or third aspects, the impersonator is applied using synthetic media generated to simulate the user during the video session.

In a further implementation form of the first, second and/or third aspects, the user moves his lips for the purpose of one or more of: speak, smile, laugh, cry and yawn.

In an optional implementation form of the first, second and/or third aspects, the user is instructed user to say one or more words selected to stimulate an increased movement of the one or more dynamic facial feature of the user.

In a further implementation form of the first, second and/or third aspects, one or more of the selected words are directed to stimulate the user to smile and/or to laugh thus accentuating the movement of one or more of the wrinkle.

In an optional implementation form of the first, second and/or third aspects, the user is determined to be genuine or not based on comparison between one or more other dynamic facial patterns of the user identified by analyzing the sequence of consecutive images of the user captured while moving his lips and one or more another reference dynamic facial patterns. The one or more another dynamic facial pattern expressing a movement of one or more of a plurality of dynamic facial features in the face of the user.

In a further implementation form of the first, second and/or third aspects, the plurality of dynamic facial features comprising: a nostril, a distance between nostrils, a facial skin portion, an eyelid, an ear and a facial muscle.

In an optional implementation form of the first, second and/or third aspects, the user is determined to be genuine or not based on comparison of one or more dynamic neck patterns of the user and one or more reference dynamic neck patterns. The one or more dynamic neck patterns identified by analyzing a sequence of consecutive images of a neck of the user captured by the one or more imaging sensor while the user says one or more word express a movement of one or more of a plurality of dynamic neck features of the user. The plurality of dynamic neck features comprising: a wrinkle, a neck skin portion, a neck muscle and the laryngeal prominence.

In a further implementation form of the first, second and/or third aspects, one or more of the reference dynamic facial patterns are defined based on analysis of a plurality of dynamic facial patterns identified for a plurality of users.

In a further implementation form of the first, second and/or third aspects, one or more of the reference dynamic facial patterns are specifically defined for the user based on one or more previously captured dynamic facial pattern of the user.

In a further implementation form of the first, second and/or third aspects, one or more of the reference dynamic facial patterns are defined by one or more rule based model.

In a further implementation form of the first, second and/or third aspects, one or more of the reference dynamic facial patterns are learned by one or more model created using one or more Machine Learning (ML) model trained with a plurality of dynamic facial features of a plurality of users.

In an optional implementation form of the first, second and/or third aspects, the comparison is done using one or more of the trained ML models applied to extract one or more feature vectors from the at least some images and classify the at least one extracted feature vector according to one or more of the learned reference dynamic facial pattern. The one or more feature vectors express movement of at least some of the plurality of wrinkles and/or if the other dynamic facial features.

In an optional implementation form of the first, second and/or third aspects, the face of the user is illuminated to accentuate the movement of the one or more dynamic facial features of the user.

In an optional implementation form of the first, second and/or third aspects, biometrically authenticating the user is done based on one or more of the dynamic facial patterns compared to a biometric face signature of the user.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
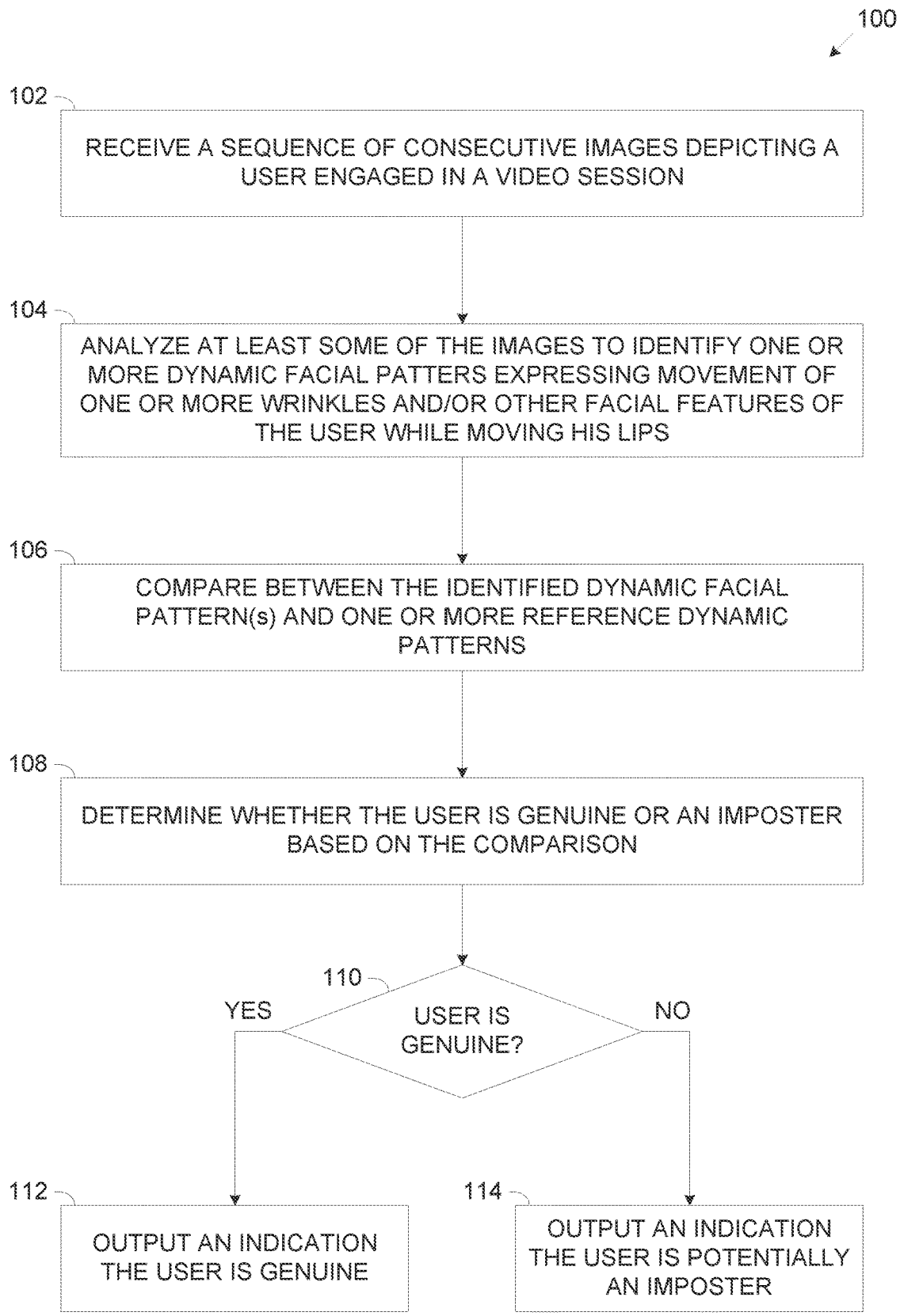
FIG. 1 is a flowchart of an exemplary process of determining whether a user engaged in a video session is genuine or a potential impersonator, according to some embodiments of the present invention.

The present invention, in some embodiments thereof, relates to detecting whether a user engaged in a video session is genuine or not, and, more specifically, but not exclusively, to detecting whether a user engaged in a video session is genuine or not based on analysis of dynamic facial features of the user.

According to some embodiments of the present invention, there are provided methods, systems and computer program products for determining whether users engaged in interactive video sessions are genuine users or potential impersonators impersonating as the users, for example, another person wearing a mask, synthetic media simulating the user's face ("deep fake") and/or the like.

The impersonator (imposter) may typically be able to convincingly imitate and/or simulate the lips movement of the user while talking. Therefore, in order to overcome this capability of the impersonator and determine (estimate) with high certainty whether the user is genuine or not, the determination may be based on analysis of movement of one or more dynamic facial features of the user (liveness) during the video session while the user moves his lips, for example, talking, smiling, laughing, crying, frowning, yawning and/or the like. The dynamic facial features may include for example, a wrinkle, a nostril, a distance between nostrils, a facial skin portion, an eyelid, an ear, a facial muscle and/or the like which are capable and may typically move while a person moves his lips.

Optionally, the determination of whether the user is genuine or not may be further based on analysis of movement of one or more dynamic neck features of the user which may move during the video session, for example, a wrinkle, a neck skin portion, a neck muscle, the laryngeal prominence and/or the like.

The user using a client device to engage in the video session may be monitored by one or more imaging sensors, for example, a camera, a video camera, a webcam and/or the like deployed to depict at least the face of the user and optionally at least part of the neck of the user during the video session, specifically while the user is moving his lips. The imaging sensor(s) which may typically be same imaging sensor(s) coupled to the client device to establish the video session may capture one or more sequences of consecutive images depicting the face of the user and optionally at least part of his neck.

At least some of the consecutive images may be analyzed to identify one or more dynamic facial patterns expressing a movement of one or more of the user's dynamic facial features and optionally of one or more of the user's dynamic neck features.

Optionally, the face of the user is illuminated while capturing the consecutive images in order to accentuate the dynamic facial feature(s) and optionally the dynamic neck feature(s) identified in the user's face and optionally in the user's neck.

Optionally, the user is instructed to say one or more words selected to stimulate an increased movement of one or more of the user's dynamic facial features and optionally the user's dynamic neck feature(s). For example, a joke, a funny phrase, an out of context sentence, a dramatic phrase and/or the like may be selected to stimulate an emotional reaction from the user (e.g. smile, laugh, cry, etc.) which may be reflected by increased movement of his dynamic facial features and optionally his dynamic neck feature(s). In another example, a serious text, a complex word and/or the like may be selected to stimulate an exaggerated and/or excess effort pronunciation of the words which may also reflected by increased movement of the user's dynamic facial features and optionally his dynamic neck feature(s).

The identified dynamic facial pattern(s) may be compared with one or more respective reference dynamic facial patterns which may express typical movement patterns of the dynamic facial features while the lips are moving, for example, while speaking, smiling, laughing, frowning, yawning and/or the like.

The reference dynamic facial patterns may include one or more general patterns typical to all people and/or to groups of people characterized by one or more attributes (e.g. gender, age, ethnic origin, etc.). One or more of the reference dynamic facial patterns may be created based on analysis of a plurality of images depicting the face of a plurality of users while moving their lips, for example, while engaged in video session. One or more of the reference dynamic facial patterns may be defined according to one or more rule based models created by one or more experts based on domain knowledge. One or more of the reference dynamic facial patterns may be learned (created) using one or more Machine Learning (ML), for example, a neural network, a Support Vector Machine (SVM) and/or the like trained with training datasets comprising a plurality of dynamic facial features of a plurality of users. However, the reference dynamic facial patterns may include one or more specific patterns typical to specific users. Such specific reference dynamic facial patterns may be created by analyzing dynamic facial features identified during one or more previous video sessions of the specific user and/or by training the ML models with the dynamic facial features identified during the user's previous video sessions. The dynamic facial patterns created and learned by the ML model(s) may be typically represented by feature vectors expressing the movement of the wrinkles and/or the other dynamic facial features of the user while moving his lips and may be therefore used and/or referenced interchangeably.

Optionally, one or more of the ML models trained to identify the feature vector(s) of the user and/or of a plurality of users may be applied to at least some of the consecutive images depicting the face of the user during the video session to determine whether the user is a genuine user or a potential imposter. The ML model(s) may be applied to extract one or more feature vectors expressing the movement of at least some (multitude) of the plurality of wrinkles and/or of the other dynamic facial features detected in the face of the user while moving his lips during the (current) video session. The ML model(s) may then classify the extracted feature vector(s) accordingly to determine whether the user is a genuine user or not.

Based on the comparison, specifically based on a deviation of the identified dynamic facial pattern(s) compared to the reference dynamic facial pattern(s), the user may be determined to be a genuine user or a potential impersonator. In particular, since reliably simulating the dynamic facial patterns by artificial means may be very difficult and possibly infeasible, high compliance (match) of the identified dynamic facial pattern(s) with the reference dynamic facial pattern(s) may be highly indicative that the user is a genuine user. In contrast, non-compliance and significant deviation of the identified dynamic facial pattern(s) compared to the reference dynamic facial pattern(s) may be highly indicative that the user is a potential impersonator.

Optionally, in a similar manner, the identified dynamic neck pattern(s) may be compared with one or more respective reference dynamic neck patterns which may express typical movement patterns of the dynamic neck features while the lips are moving. Determining whether the user is genuine or not may be thus further improved based on the comparison between the identified dynamic neck pattern(s) compared to the reference dynamic neck pattern(s).

Moreover, determining whether the user is a genuine user or a potential impersonator may be further applied to authenticating the user, in particular for biometric authentication of the user based on face recognition. In particular, while comparing facial features extracted from the images depicting the user to one or more biometric face signatures captured previously and verified for the user, the dynamic facial pattern(s) identified in the images may be further compared with one or more of the reference dynamic facial patterns previously detected, learned and/or otherwise recorded for the user.

Determining whether users engaged in video sessions are genuine user or not based on analysis of dynamic facial, and optionally dynamic neck features, may present major advantages and benefits compared to existing methods for determining the genuineness of the users.

First, highly reliable face masks exist in which the movement of the mask's lips may be highly coordinated and synchronized with the lips of a person wearing and/or using the mask thus presenting a reliable appearance of the impersonated user while engaging in the video session. Moreover, modern technology enables, as demonstrated recently over and over, creation of synthetic data which may very reliably impersonate a face of a human user including lips movement thus creating a highly convincing impersonation of the user. Therefore, existing methods relying on identifying and analyzing lips movement to determine whether the user is genuine may be easily deceived.

However, reliably impersonating the dynamic facial patterns typical to human users, in particular while engaged in interactive video sessions may be significantly more and typically impossible to imitate. Therefore, determining whether a user is a genuine user or not based on the analysis and compliance of the dynamic facial patterns identified for the user during the video session may be highly reliable, accurate and/or robust compared to the existing methods.

Moreover, analyzing the dynamic neck pattern(s) identified for the user during the video session may further increase the reliability, accuracy and/or robustness of the user genuineness determination (estimation) since such neck dynamic features are also very hard to imitate and may be thus, at best, poorly simulated by potential impersonators.

Furthermore, accentuating the dynamic facial features (and optionally the dynamic neck features) through the illumination and/or stimulation of the user may allow for improved detection of the dynamic facial patterns (and respectively, the dynamic neck patterns) which may further increase reliability, accuracy and/or robustness of the determination of whether the user is a genuine user or not.

In addition, using the determination of whether the user is a genuine user or not to the biometric face recognition based authentication may significantly enhance and/or improve reliability, accuracy and/or robustness of the user's biometric authentication compared to existing face recognition based authentication methods. The existing methods may compare face features of the user which are identified in the images with one or more biometric face signatures of the user which are previously captured and verified. However, since the face of the user may be convincingly imitated and/or simulated, the existing methods may be susceptible to deception by one or more of the impersonators. In contrast as stated herein before, convincingly imitating movement of the facial features of the user during the video session may be significantly more challenging and typically impossible for the impersonators. Therefore, comparing the dynamic facial patterns identified in the images depicting the user during the video session with one or more of the reference dynamic facial patterns previously detected, learned and/or otherwise recorded for the user may significantly enhance face recognition based authentication.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of determining whether a user engaged in a video session is genuine or a potential impersonator, according to some embodiments of the present invention. An exemplary process 100 may be executed to analyze a sequence of consecutive images depicting a user engaged in a video session to determine whether the user is a genuine user or a potential impersonator. In particular, the consecutive images are analyzed to identify one or more dynamic facial patterns expressing movement of wrinkles and optionally additional facial features of the user (liveness) while the user's lips are moving.

The impersonator (imposter) which may be, for example, a person wearing a mask, synthetic media simulating the user's face ("deep fake") and/or the like may typically convincingly imitate and/or simulate the lips movement of the user while talking. However, such impersonators may be very limited in successfully simulating the movement of the user's facial features. Therefore, by identifying the dynamic feature patter(s) and comparing them with reference patterns corresponding to genuine users, it may be possible to determine, with high success probability, whether the user is genuine or not.

Figure 2A:
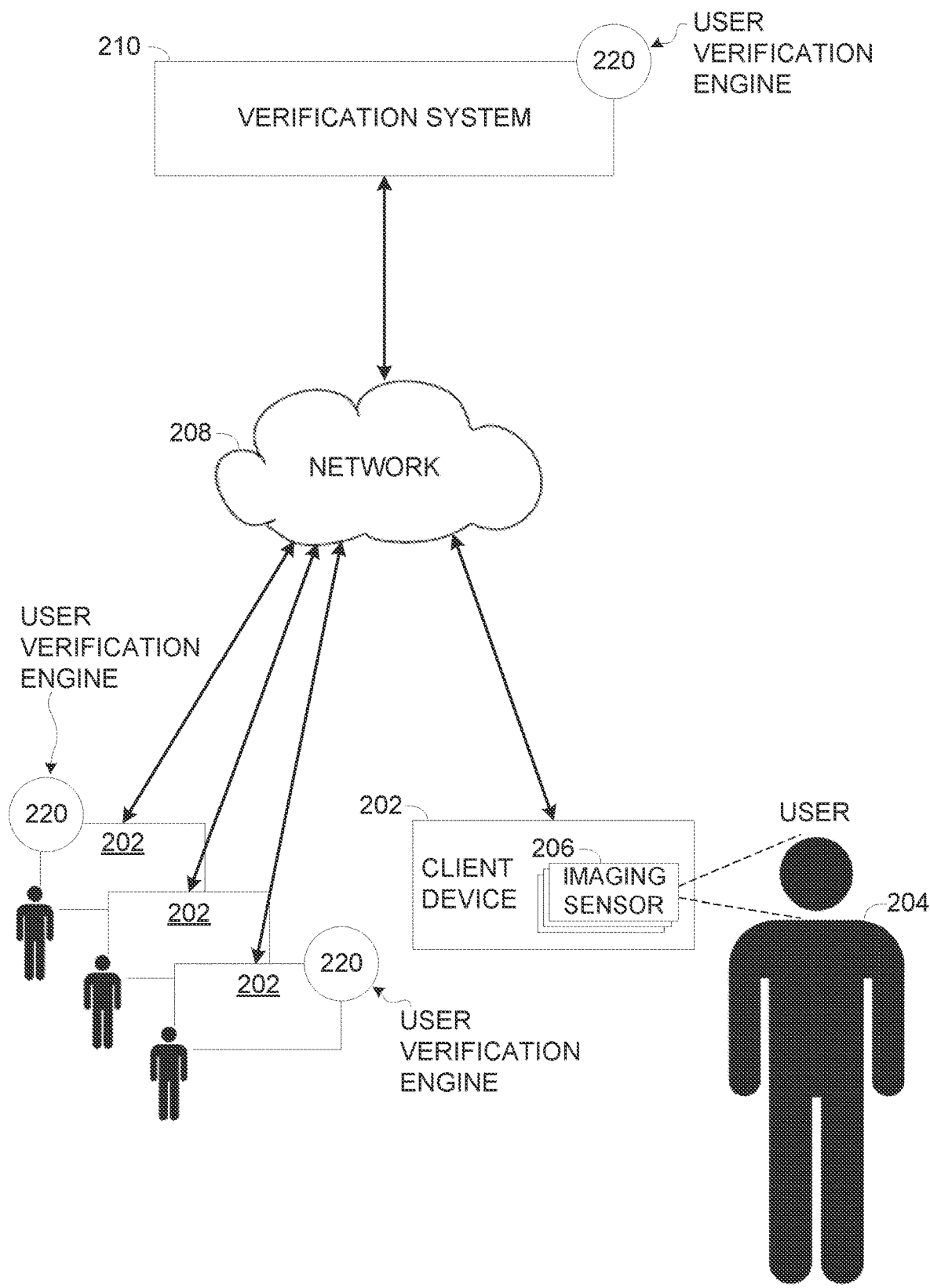
FIG. 2A and FIG. 2B are schematic illustrations of an exemplary system for determining whether a user engaged in a video session is genuine or a potential impersonator, according to some embodiments of the present invention.
Figure 2B:
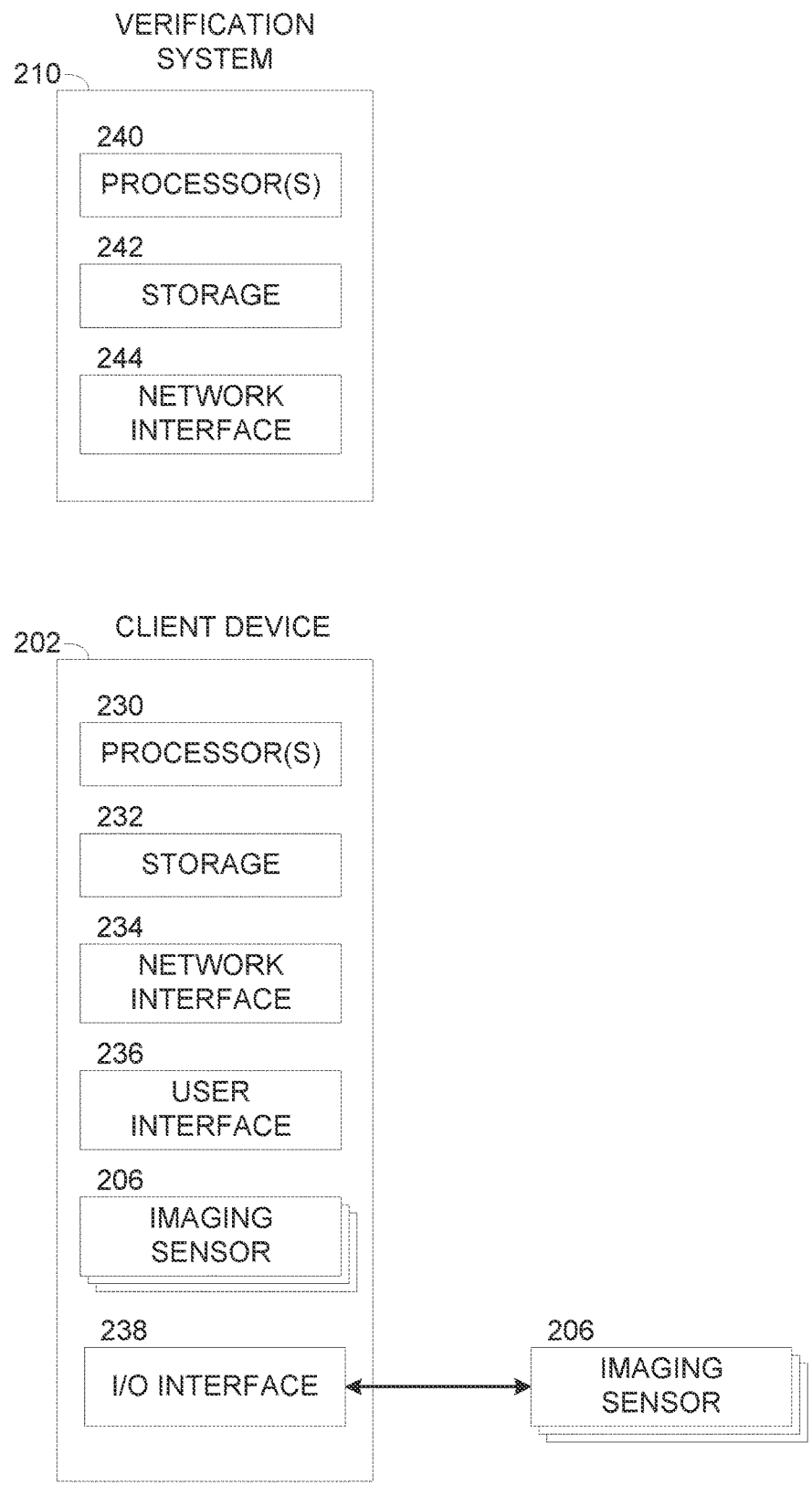

Reference is also made to FIG. 2A and FIG. 2B, which are schematic illustrations of an exemplary system for determining whether a user engaged in a video session is genuine or a potential impersonator, according to some embodiments of the present invention.

As seen in FIG. 2A, one or more users 204 may use respective client devices 202, for example, a server, a desktop computer, a laptop computer, a Smartphone, a tablet, a proprietary client device and/or the like to engage in one or more video sessions, for example, a video conference, a video chat, a video authentication session and/or the like with one or more other users 204 using their client devices 202. Optionally, one or more of the users 204, using their respective client devices 202, may engage in one or more video sessions with one or more automated systems, for example, a Chatbot, an automated video authentication system and/or the like.

The video session(s) may be established over a network 208 comprising one or more wired and/or wireless networks, for example, a Local Area Network (LAN), a Wireless LAN (WLAN, e.g. Wi-Fi), a Wide Area Network (WAN), a Metropolitan Area Network (MAN), a cellular network, the internet and/or the like.

Each of the client devices 202 used for engaging in the video session may be equipped with one or more imaging sensors 206, for example, a camera, a video camera, a webcam and/or the like configured to capture images of the user 204 during the video session. Specifically, the imaging sensor(s) 206 may be deployed to capture images of a face of the user 204 in order to capture movement of one or more facial features of the user 204, for example, a wrinkle, a nostril, a distance between nostrils, a facial skin portion, an eyelid, an ear, a facial muscle and/or the like. One or more of the imaging sensor(s) 206 may be further deployed and/or adjusted to capture images of at least part of a neck of the user 204 in order to capture movement of one or more neck features of the user 204, for example, a wrinkle, a neck skin portion, a neck muscle, the laryngeal prominence and/or the like.

Moreover, the imaging sensor(s) 206 may be configured to capture one or more sequences of consecutive images, for example, a video clip at a frame rate sufficient for detecting movement of one or more of the facial features and optionally of one or more of the neck features of the user 204, for example, 25 frames per second (fps), 30 fps, 50 fps and/or the like.

One or more of the client devices 202 may execute a user verification engine 220 configured to execute the process 100 for verifying that the user 204 on the other end of the video session is a genuine user rather than an impersonator attempting to impersonate as the user 204 during the video session. The impersonator may be, for example, another person wearing and/or using a mask to impersonate as the user 204 during the video session. In another example, the impersonator may be created, generated, and/or otherwise applied using synthetic media generated to simulate the user 204 during the video session.

Optionally, a verification system 210, for example, a server, a computing node, a cluster of computing nodes and/or the like is deployed to execute the user verification engine 220 and provide user genuineness verification services to one or more of the users 204 via their respective client devices 202.

As seen in FIG. 2B, each client device 202 may comprise a processor(s) 230, a storage 232 for storing data and/or code (program store), a network interface 234 for connecting to the network 208 and a user interface 236 for interacting with the user 204. The client device 202 may further include one or more imaging sensors such as the imaging sensors 206. Optionally, the client device 202 may include an Input/Output (I/O) interface 238 for connecting to one or more external and/or attachable devices, for example, one or more imaging sensors such as the imaging sensors 206.

The processor(s) 230, homogenous or heterogeneous, may include one or more processing nodes and/or cores arranged for parallel processing, as clusters and/or as one or more multi core processor(s). The storage 232 may include one or more non-transitory persistent storage devices, for example, a Read Only Memory (ROM), a Flash array, a Solid State Drive (SSD), a hard drive (HDD) and/or the like. The storage 232 may also include one or more volatile devices, for example, a Random Access Memory (RAM) component, a cache and/or the like.

The network interface 234 may include one or more wired and/or wireless network interfaces, for example, a LAN interface, a WLAN interface, a WAN interface, a MAN interface, a cellular interface and/or the like. Via the network interface 234, the client device 202 may establish one or more video sessions with one or more of the client devices 202 and/or communicate with the remote verification system 210.

The user interface 236 may include one or more Human-Machine Interfaces (HMI) for interacting with the user 204, for example, a keyboard, a touchpad, a pointing device, a touchscreen, a screen, a digital pen, a speaker, an earphone, a microphone and/or the like.

The I/O interface 238 may include one or more wired and/or wireless I/O interfaces, for example, a Universal Serial Bus (USB) port, a WLAN (e.g. Wi-Fi), a serial port, a Bluetooth (BT) interface, a Radio Frequency (RF) interface, an infrared (IR) interface, a Near Field (NF) interface and/or the like for communicating and/or attaching to one or more external devices and/or attachable devices.

As stated herein before, the client device 202 may be communicatively coupled to one or more imaging sensors 206 which may be integrated in the client device 202 and/or attached to the client device 202. For example, assuming the client device 202 is a cellular phone, the cellular phone may include one or more integrated imaging sensors 206, for example, an integrated camera, an integrated video camera and/or the like. In another example, assuming the client device 202 is a desktop computer, the desktop computer may connect to one or more attachable imaging sensors 206, for example, a webcam and/or the like via one or more of the I/O interfaces, for example, the USB and/or the Wi-Fi interfaces.

The processor(s) 230 may execute one or more software modules such as, for example, a process, a script, an application, an agent, a utility, a tool and/or the like each comprising a plurality of program instructions stored in a non-transitory medium (program store) such as the storage 232 and executed by one or more processors such as the processor(s) 230. Optionally, the processor(s) 230 may include and/or be supported by one or more hardware modules (elements) integrated in the client device 202, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU) and/or the like.

The processor(s) 240 may therefore execute one or more functional modules which may be implemented via one or more software modules, one or more of the hardware modules and/or a combination thereof. In particular, the processor(s) 240 may execute the user verification engine 220 for verifying that one or more users 204 engaged in one or more video sessions are genuine users rather than potential impersonators.

The verification system 210 may comprise a processor(s) 240 such as the processor(s) 230, a storage 242 for storing data and/or code (program store) and a network interface 244 such as the network interface 234 for connecting to the network 208.

As described herein before, the processor(s) 240, homogenous or heterogeneous, may include one or more processing nodes arranged for parallel processing, as clusters and/or as one or more multi core processor(s). The storage 242 may include one or more non-transitory persistent storage devices, for example, a ROM, a Flash array, an SSD, an HDD and/or the like, as well as one or more volatile devices, for example, a RAM component, a cache and/or the like. The storage 242 may further comprise one or more network storage devices, for example, a storage server, a Network Accessible Storage (NAS), a network drive, a database server and/or the like accessible through the network interface 244.

The processor(s) 240 may execute one or more software modules each comprising a plurality of program instructions stored in a non-transitory medium (program store) such as the storage 242 and executed by one or more processors such as the processor(s) 240. The processor(s) 240 may further utilize one or more hardware modules (elements) integrated in remote verification system 210, for example, a circuit, a component, an IC, an ASIC, an FPGA, a DSP, a GPU, a network processor and/or the like.

The processor(s) 250 may therefore execute one or more functional modules implemented using one or more software modules, one or more of the hardware modules and/or combination thereof, in particular the user verification engine 220.

Optionally, the verification system 210, specifically the user verification engine 220 may be implemented and/or utilized by one or more cloud computing services, for example, an Infrastructure as a Service (IaaS), a Platform as a Service (PaaS), a Software as a Service (SaaS) and/or the like such as, for example, Amazon Web Service (AWS), Google Cloud, Microsoft Azure and/or the like.

The process 100 may be executed to verify that one or more of the users 204 using their respective client devices 202 to engage in one or more video sessions are genuine users rather than impersonators. One or more implementation and/or operation modes may be applied to execute the user verification engine 220, some of which are described herein. This however, should not be construed as limiting since other modes may be apparent to a person skilled in the art. For example, assuming a first user 204 uses a first client device 202 to engage in a video session with a second user 204 using a second client device 202. In a first exemplary deployment and operation mode, the user verification engine 220 may be executed by a first client device 202 to verify that the second user 204 is a genuine user. In another exemplary deployment and operation mode, the user verification engine 220 may be executed by the verification system 210 as a service the first user 204 to verify that the second user 204 is genuine. In another exemplary deployment and operation mode, the user verification engine 220 may be executed by the second client device 202 to verify that the second user 204 is a genuine user. Naturally, this later operation mode may be applied in case the second client device 202 is configured to execute the user verification engine 220 in trusted mode such that it may not be adjusted, manipulated, tweaked and/or otherwise altered to falsely verify an impersonator using the second client device 202 as a genuine user.

It should be noted that the process 100 is not directed to authenticating an identity of the users 204 but rather to verify the users 204 are genuine users and not impersonators attempting to impersonate as the genuine users 204.

As shown at 102, the process 100 starts with the user verification engine 220 receiving a sequence of consecutive images captured by of the imaging sensor configured to depict at least a face of a user 204 engaged in a video session using his respective client device 202.

As there exist multiple implementation, deployment and/or operation modes for executing the user verification engine 220, the user verification engine 220 may receive the images accordingly. To continue the previously presented example, assuming a user 204 uses a first client device 202 to engage in a video session with a second user 204 using a second client device 202. The second client device 202 may be communicatively coupled to one or more imaging sensors 206 deployed to depict at least the face of the second user 204 and configured to capture one or more sequences of consecutive images of the face of the user 204. In case the user verification engine 220 is executed by the first client device 202, the user verification engine 220 may receive the sequence of consecutive images from the second client device 202 which may collect the images from the imagining sensor(s) 206 deployed to depict the second user 204. These images may be naturally available to the first client device 202 as part of the video session. In case the user verification engine 220 is executed by the verification system 210, the second client device 202 may collect the images from the imagining sensor(s) 206 deployed to depict the second user 204 and transmit at least some of the captured images to the verification system 210 executing the verification engine 220. In case the user verification engine 220 is executed by the second client device 202, the second client device 202 may simply collect the images captured by the imagining sensor(s) 206 deployed to depict the second user 204.

In particular, the user verification engine 220 may receive and/or select consecutive images depicting at least the face of the user 204 while the user 204 moves his lips for one or more purposes, for example, speaking, smiling, laughing, crying, yawning, frowning and/or the like. The method for selecting such images in which lips movement is detected may be done using one or more computer vision, image processing, classification methods and/or the like and is beyond the scope of this disclosure.

As shown at 104, the user verification engine 220 may analyze at least some of the consecutive images of one or more of the sequence(s) depicting the face of the user 204 to identify one or more dynamic facial patterns of the user 204 while his lips are moving.

The verification engine 220 may use one or more analysis technologies, methods, tools and/or algorithms as known in the art for analyzing the images, for example, computer vision, image processing and/or the like.

Each dynamic facial pattern may express a movement of one or more of a plurality of wrinkles detected in the face of the user 204 while the lips of the user 204 are moving, for example, a mouth side wrinkle, an upper lip wrinkle, a lower lip wrinkle, an eye side wrinkle, a forehead wrinkle, a check wrinkle, a chin wrinkle and/or the like.

Analyzing the consecutive images while the lips of the user 204 are moving, the user verification engine 220 may identify one or more of the dynamic facial patterns expressing wrinkle(s) movement. For example, when speaking, the user 204 moves his lips which may cause one or more mouth side wrinkles of the user 204 to move. The user verification engine 220 may identify the movement of the mouth side wrinkles and may express it by a respective dynamic facial pattern. In another example, when smiling, the user 204 may stretch his lips which may cause one or more eye side wrinkles of the user 204 to move. The user verification engine 220 may identify this eye side wrinkle(s) movement and may be express it by a respective dynamic facial pattern. In another example, when frowning, the user 204 may open his mouth and lips which may cause one or more forehead and/or chin wrinkles of the user 204 to move. The user verification engine 220 may identify the forehead and/or chin wrinkle(s) movement and may express them by one or more respective dynamic facial patterns.

Figure 3:
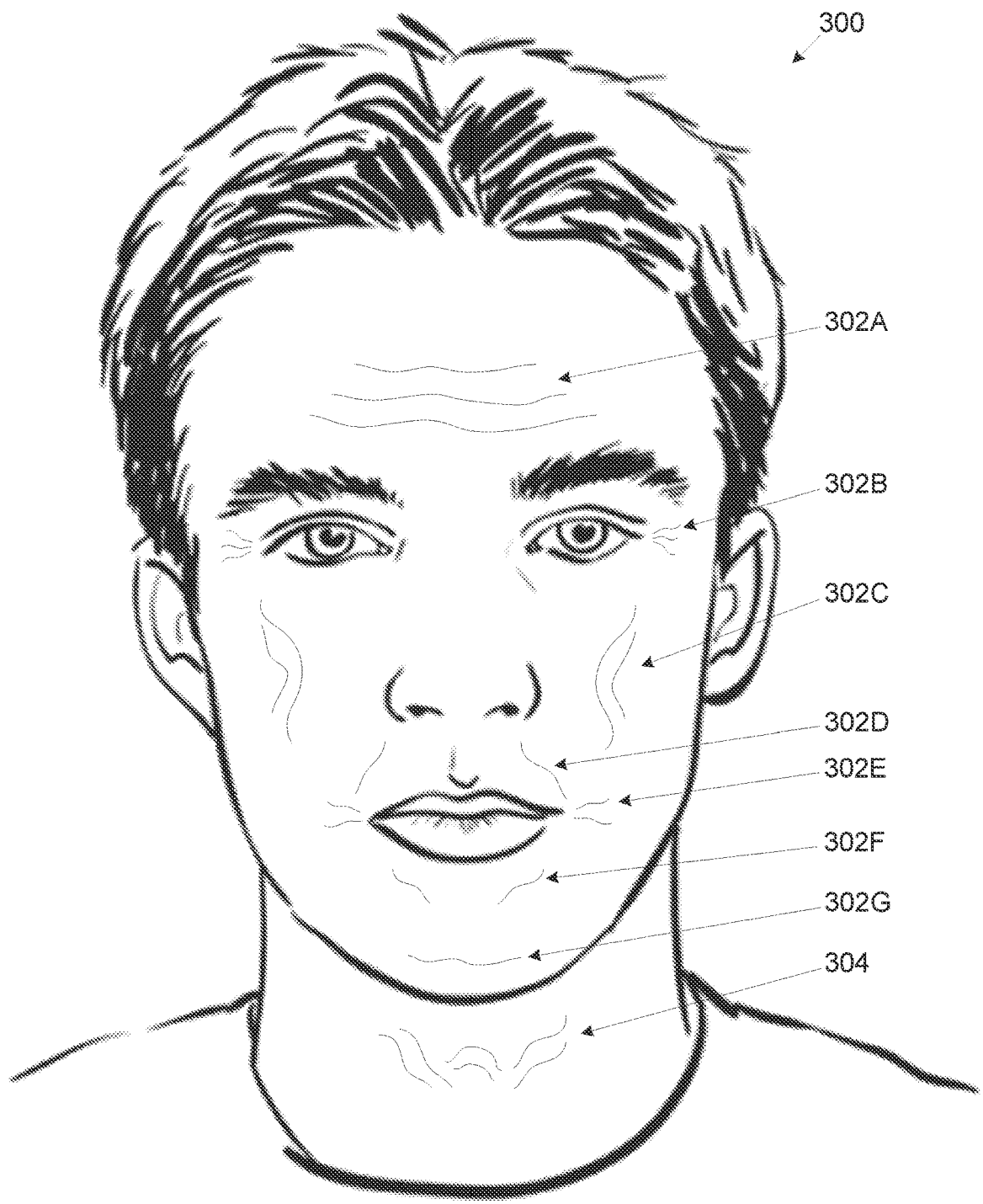
FIG. 3 is a schematic illustration of exemplary dynamic wrinkles analyzed to determine whether a user engaged in a video session is genuine or a potential impersonator, according to some embodiments of the present invention.

Reference is now made to FIG. 3, which is a schematic illustration of exemplary dynamic wrinkles analyzed to determine whether a user engaged in a video session is genuine or a potential impersonator, according to some embodiments of the present invention. An exemplary image 300 may depict a user such as the user 204 using a client device such as the client device 202 to engage in a video session with one or more other users 204 using respective client devices 202.

A user verification engine such as the user verification engine 220 may analyze the image 300 to identify a plurality of wrinkles 302 in the face of the user 204, in particular while the user 204 moves his lips. The wrinkles 302 may include, for example, one or more forehead wrinkles 302A, one or more eye side wrinkles 302B, one or more cheek wrinkles 302C, one or more upper lip wrinkles 302D, one or more mouth side wrinkles 302E, one or more lower lip wrinkles 302F, one or more chin wrinkles 302G and/or the like.

The wrinkles detected in one or more of the images captured by the imaging sensor(s) 206 may further include one or more neck wrinkles 304 detected in at least part of the neck of the user 204.

Reference is made once again to FIG. 1.

Optionally, the user verification engine 220 may analyze at least some of the consecutive images depicting the face of the user 204 to identify one or more additional dynamic facial patterns of the user 204 which may express a movement of one or more other facial features detected in the face of the user 204, for example, a nostril, a distance between nostrils, a facial skin portion, an eyelid, an ear, a facial muscle and/or the like.

Therefore, by analyzing the consecutive images while the lips of the user 204 are moving, the user verification engine 220 may further identify one or more of the additional dynamic facial patterns expressing movement of one or more of the other facial features of the user 204. For example, when speaking, the user 204 moves his lips which may cause one or more of his nostrils to move which may be expressed by a respective dynamic facial pattern. Moreover, when the user 204 speaks, the distance between his nostrils may change between consecutive images such that the changing distance may be expressed by a respective dynamic facial pattern. In another example, when laughing, the user 204 moving his lips may cause one or more skin portions of his face to move which may be expressed by one or more respective dynamic facial patterns. In another example, when laughing or crying, the user 204 moving his lips may further close one or more of his eyelids and/or ears which may be expressed by one or more respective dynamic facial patterns.

Optionally, the face of the user 204 is illuminated during at least part of the video session to accentuate the movement of one or more of the wrinkles and/or the dynamic facial feature identified in the face of the user 204 while engaged in the video session. The illumination may be be emitted from one or more sources configured to illuminate the face of the user 204, for example, in response to an instruction from the user verification engine 220, during one or more time periods (e.g. continuous, periodic, on demand, etc.) during which the imaging sensor(s) 206 may capture a plurality of images of the face of the user 204. For example, the client device 202 used by the user 204 may be a mobile device which may be equipped with a light source, specifically a front light source (e.g. lamp, flash, etc.) facing the user 204. In another example, assuming the client device 202 used by the user 204 may be a desktop computer coupled to a webcam imaging sensor 206 which may comprise a light source (e.g. lamp, flash, etc.) facing the user 204.

Moreover, the light emitted to illuminate the face of the use 204 during the video session may vary and/or change such that the face of the use 204 is illuminated with light having one or more different parameters, for example, intensity, wavelength, source angle and/or the like. Illuminating the face of the user 204 with the varying illumination may further accentuate the movement of one or more of the wrinkles and/or the other dynamic facial feature identified in the face of the user 204 while engaged in the video session.

Optionally, during the video session, the user 204 may be instructed, for example, by the user verification engine 220 to say one or more words selected to stimulate an increased movement of one or more of the wrinkles and/or one or more of the other dynamic facial features identified in the face of the user 204. In particular, the word(s) may be selected to stimulate an emotional reaction in the user 204 which may be reflected by the increased movement of one or more of his wrinkles and/or one or more of his other dynamic facial features. For example, the user 204 may be instructed to say one or more words, for example, a joke, a funny phrase, an out of context sentence and/or the like which may cause the user 204 to smile and/or laugh thus accentuating the movement of one or more of the wrinkles and/or one or more of the other dynamic facial features identified in the face of the user 204. In another example, the user 204 may be instructed to say one or more words, for example, a long word, a series text and/or the like in an exaggerated pronunciation which may increase and thus accentuate the movement of one or more of the wrinkles and/or one or more of the other dynamic facial features identified in the face of the user 204.

Accentuating the wrinkles and/or the other dynamic facial features identified in the face of the user 204 during the video session may significantly increase the accuracy, quality and/or robustness of the analysis and identification of the dynamic facial features by the user verification engine 220.

As shown at 106, the user verification engine 220 may compare between one or more of the identified dynamic facial patterns and one or more respective reference dynamic facial patterns applicable for the user 204.

The reference dynamic facial patterns may be generated, simulated, learned and/or otherwise created using one or more of a plurality of methods, techniques and/or algorithms.

For example, one or more of the reference dynamic facial patterns may be defined based on analysis of a plurality of dynamic facial patterns identified for a plurality of users such as the user 204. Such an analysis may result in detecting one or more dynamic facial patterns characteristic to a plurality of people and may be thus applicable for the user 204. The analysis may be conducted by analyzing a plurality of consecutive image captured to depict the plurality of users 204 while their lips are moving, specifically during video sessions. The analysis may be further directed to segment the plurality of users 204 to a plurality of groups based on one or more user attributes of the uses 204, for example, gender, age, ethnic origin and/or the like in order to generate one or more of the reference dynamic facial patterns which are typical for each such group. For example, based on the analysis it may be determined that younger people tend to have less wrinkle movement while they move their lips. One or more of the reference dynamic facial patterns created for the group of young users 204 may therefore express subtle wrinkle movement. Optionally, one or more of the reference dynamic facial patterns created for the group of young users 204 may be more focused on the other dynamic facial features, for example, nostrils position, the distance between nostrils, movement of facial muscles (e.g. check muscle, jaw muscle, etc.) and/or face skin portions and/or the like. In another example, based on the analysis it may be determined that old people typically have a lot more wrinkle which is translated to high wrinkles movement while they move their lips. On the other hand, the high wrinkles movement may at least partially conceal movement of other dynamic facial features such as, for example, the facial muscles and/or face skin portions. One or more of the reference dynamic facial patterns created for the group of old users 204 may therefore express major wrinkle movement while reducing and/or completely avoiding reference dynamic facial patterns expressing movement of the other dynamic facial features.

In another example, one or more of the reference dynamic facial patterns may be specifically defined for the user 204 which is currently monitored to determine whether he is a genuine user or an impersonator. The specifically defined reference dynamic facial pattern(s) may be created and/or defined based on one or more previously captured dynamic facial patterns of the user 204 identified during one or more previous video sessions. Typically, the specifically defined reference dynamic facial pattern(s) may be more accurate and/or custom for the specific user 204 compared to the more general reference dynamic facial pattern(s) created based on the analysis of the dynamic facial features of a plurality of people.

In another example, one or more of the reference dynamic facial patterns may be specifically defined by one or more rule based models. These rule based models may be derived from one or more analyses conducted for either the specific user 204 and/or for the plurality of people. However, one or more rules of one or more of the rule based models may be further defined by an expert user practicing knowledge domain relating to the typical movement of the human dynamic facial wrinkles and/or other facial features while people talk.

In another example, one or more of the reference dynamic facial patterns may be learned suing one or more ML models, for example, a neural network, an SVM and/or the like which are trained with training datasets comprising a plurality of dynamic facial features of a plurality of users 204. The ML model(s) may be trained with a plurality of consecutive images depicting movement of the facial wrinkles and/or the facial features of a plurality of users 204, specifically while engaged in video sessions. During the training the ML model(s) may extract from the images a plurality of feature vectors expressing the movement of one or more of the wrinkles and/or of the other dynamic facial features identified in the face of the users 204. The ML model(s) may thus learn (create) the reference feature vectors adjusting their internal structure, weights and/or the like as known in the art to reflect one or more of the extracted feature vectors typical to the plurality of users 204. The dynamic facial patterns learned by the ML model(s) may be typically represented by feature vectors expressing the movement of the wrinkles and/or the other dynamic facial features of the user 204 while moving his lips. The feature and the dynamic facial patterns may be therefore used and/or referenced interchangeably.

The ML model(s) may be further adapted for determining whether specific users 204 are genuine or not through training using training datasets comprising a plurality of consecutive images depicting movement of the facial wrinkles and/or the other facial features of specific user 204 captured during one or more previous video sessions.

When comparing between the identified dynamic facial pattern(s) and the respective reference dynamic facial pattern(s), the user verification engine 220 may apply one or comparison and matching methods, techniques and/or modes. For example, the user verification engine 220 may apply a strict comparison mode in which even small deviations of the identified dynamic facial pattern(s) compared to the reference dynamic facial pattern(s) may be unacceptable. This may be desirable for high security, high privacy and/or sensitive video sessions. In another example, the user verification engine 220 may apply a looser comparison mode in which lower deviation thresholds may be applied such that some deviations of the identified dynamic facial pattern(s) compared to the reference dynamic facial pattern(s) may be acceptable and regarded as compliant.

According to some embodiments, the user verification engine 220 may apply one or more of the trained ML models to at least some of the consecutive images depicting the face of the user 204. The ML model(s) which are trained with a plurality of consecutive images depicting the user 204 and/or other users such as the user 204 during one or more previous video sessions are therefore adapted to identify feature vectors expressing movement of the wrinkles and/or the other dynamic facial features of the user 204. The user verification engine 220 may therefore apply the trained ML model(s) to extract one or more feature vectors expressing the movement of one or more of the wrinkles and/or the other dynamic facial features detected in the face of the user 204 while moving his lips during the (current) video session and may classify the extracted feature vector(s) accordingly to determine whether the user 204 is a genuine user or not.

As shown at 108, based on the comparison between the identified dynamic facial pattern(s) and the reference dynamic facial pattern(s), the user verification engine 220 may predict, estimate and/or determine whether the user 204 is a genuine user or a potential impersonator impersonating as the user 204, for example, another person using or wearing a mask, synthetic media simulating the face of the user 204 ("deep fake") and/or the like.

In particular, the user verification engine 220 may determine that the user 204 is a genuine user when the identified dynamic facial pattern(s) significantly comply (match) with the reference dynamic facial pattern(s). In case the identified dynamic facial pattern(s) do not (significantly) deviate from the reference dynamic facial pattern(s), the user verification engine 220 may estimate with high accuracy, certainty and/or confidence that the user 204 is a genuine user. In contrast, the user verification engine 220 may determine that the user 204 may be a potential impersonator in case the identified dynamic facial pattern(s) do not comply (match) and significantly deviate from the reference dynamic facial pattern(s).

As shown at 110, which is a conditional step, in case the user 204 is determined to be a genuine user the process 100 may branch to 112. However, in case the user 204 is determined to be a potential impersonator, the process 100 may branch to 114.

As shown at 112, since the user 204 is determined to be a genuine user, the user verification engine 220 may output an indication accordingly indicating that the user 204 is estimated to be a genuine user.

As shown at 114, since the user 204 is determined to be a potential impersonator, the user verification engine 220 may output an indication accordingly indicating that the user 204 is estimated to be an impersonator.

The indication of whether the user 204 is determined as genuine or not (impersonator) may be outputted, for example, transmitted, delivered and/or the like depending on the implementation, operations and/or deployment mode of the user verification engine 220. For example, assuming the user verification engine 220 is executed by the first client device 202 used by the first user 204 to determine whether the second user 204 is a genuine user or not. In such case, the user verification engine 220 may output the genuineness notification to the first user 204 via one or more user interfaces available by the user interface 236 of the first client device 202. In another example, assuming the user verification engine 220 is executed by the second client device 202 used by the second user 204 to determine whether the second user 204 is a genuine user or not. In such case, the user verification engine 220 may transmit the indication to the first client device 202 which in turn may output the genuineness notification to the first user 204 via one or more user interfaces available by the user interface 236 of the first client device 202. In another example, assuming the user verification engine 220 is executed by the verification system 210 serving the first user 204 using the first client device. In such case, the user verification engine 220 may output the genuineness notification to the first user 204 via one or more user interfaces available by the user interface 236 of the first client device 202.

According to some embodiments of the present invention, determining whether the user 204 is a genuine user or a potential impersonator serves to enhance and improve authentication of the user 204, in particular biometric authentication of the user 204 and more specifically a face recognition based biometric authentication.

Face recognition based biometric authentication may be applied for a plurality of applications. For example, the use 204 may be required to engage in a video session in order to be authenticated compared to his biometric face signature for accessing one or more services, for example, an automated teller machine, an online service such as an online financial and/or banking service, an online social media (network) and/or the like.

Face recognition as known in the art is based on comparing face features of the user 204 identified in the images with one or more biometric face signatures captured previously and verified for the user 204. However, since the face of the user 204 may be convincingly imitated and/or simulated such biometric face signature authentication may be susceptible to deception by one or more of the impersonators. The user verification engine 220 may therefore significantly enhance and improve the face recognition based authentication by further comparing one or more of the dynamic facial patterns identified in the images depicting the user 204 during the video session with one or more of the reference dynamic facial patterns previously detected, learned and/or otherwise recorded for the user 204. In other words, the biometric face signature of the user 204 may be enhanced to include the reference dynamic facial patterns of the user 204 such that authenticating the user 204 is further based on the comparison of the dynamic facial pattern(s) of the user 204 to significantly improve immunity of the biometric face authentication to the potential impersonators.

Optionally, the user verification engine 220 may determine whether the user 204 is a genuine user or a potential impersonator based on analysis of one or more dynamic neck patterns identified for the user 204 during the video session.

The analysis and determination based on the dynamic neck patterns may be facilitated by one or more imaging sensors 206 deployed to depict at least part of a neck of the user 204 and capture one or more sequences of images depicting the at least part of the neck during the video session. The verification engine 220 may receive sequence(s) of consecutive images depicting the at least part of the neck of the user 204 depending on the implementation, operation and/or deployment mode of the verification engine 220 as described for the images depicting the face of the user 204.

The user verification engine 220 may analyze at least some consecutive images of the received sequence(s) to identify one or more dynamic neck patterns of the user 204. As described for the dynamic facial patterns, each dynamic neck pattern may express (reflect) a movement of one or more of a plurality of dynamic neck features detected in the images depicting the neck of the user 204. Such dynamic neck features may include, for example, a wrinkle, a neck skin portion, a neck muscle, the laryngeal prominence and/or the like.

As such, analyzing the consecutive images depicting the at least part of the neck of the user 204 during the video session, the user verification engine 220 may identify one or more of the dynamic neck patterns expressing movement of one or more of the dynamic neck features. For example, when the user 204 speaks, the laryngeal prominence of the user 204 may move, typically up and down. The user verification engine 220 may identify such movement of the laryngeal prominence and may express it a respective dynamic neck pattern. In another example, when the user 204 speaks or laughs, one or more wrinkles detected in the neck of the user 204 may move. The user verification engine 220 may identify the wrinkle(s) movement and may express it by a respective dynamic neck pattern. In another example, when the user 204 speaks or laughs, one or more neck muscles and/or neck skin portions of the user 204 may move. The user verification engine 220 may identify these muscle(s) and/or skin movement(s) and may express them by one or more respective dynamic neck patterns.

The user verification engine 220 may then compare between the identified dynamic neck pattern(s) and one or more respective reference dynamic neck patterns applicable for the user 204. The reference dynamic neck patterns may be generated, simulated, learned and/or otherwise created similarly to the reference dynamic facial patterns.

Based on the comparison between the identified dynamic neck pattern(s) and the reference dynamic neck pattern(s), the user verification engine 220 may improve accuracy, reliability and/or robustness of the determination, prediction and/or estimation of whether the user 204 is genuine or not made based on the dynamic facial pattern(s) comparison.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms tamper evident elements technologies and materials are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of determining whether a user engaged in an interactive video session is genuine, comprising:
    using at least one processor for:
        receiving a sequence of consecutive images captured by at least one imaging sensor configured to depict at least a face of a user engaged in a video session while the user moves his lips;
        instructing the user to say at least one word selected to stimulate an increased movement of at least one dynamic facial pattern of the user;
        analyzing at least some of the images of the sequence to identify the at least one dynamic facial pattern of the user while his lips are moving, the at least one dynamic facial pattern expressing a movement of at least one of a plurality of wrinkles in the face of the user;
        determining whether the user is genuine or an impersonator based on a comparison between the at least one identified dynamic facial pattern of the user and at least one reference dynamic facial pattern; and
        outputting an indication of whether the user is genuine or not based on the determination;
    wherein the at least one selected word is directed to stimulate the user to smile and/or to laugh thus accentuating the movement of the at least one wrinkle.

2. The method of claim 1, wherein the impersonator uses a mask to impersonate as the user during the video session.

3. The method of claim 1, wherein the impersonator is applied using synthetic media generated to simulate the user during the video session.

4. The method of claim 1, wherein the user moves his lips for the purpose of at least one of: speak, smile, laugh, cry and yawn.

5. The method of claim 1, further comprising determining whether the user is genuine or not based on comparison between at least one another dynamic facial pattern of the user identified by analyzing the sequence of consecutive images of the user captured while moving his lips and at least one another reference dynamic facial pattern, the at least one another dynamic facial pattern expressing a movement of at least one of a plurality of dynamic facial features in the face of the user.

6. The method of claim 5, wherein the plurality of dynamic facial features comprising: a nostril, a distance between nostrils, a facial skin portion, an eyelid, an ear and a facial muscle.

7. The method of claim 1, further comprising determining whether the user is genuine or not based on comparison of at least one dynamic neck pattern of the user and at least one reference dynamic neck pattern, the at least one dynamic neck pattern identified by analyzing a sequence of consecutive images of a neck of the user captured by the at least one imaging sensor while the user says at least one word expresses a movement of at least one of a plurality of dynamic neck features of the user, the plurality of dynamic neck features comprising: a wrinkle, a neck skin portion, a neck muscle and the laryngeal prominence.

8. The method of claim 1, wherein the at least one reference dynamic facial pattern is defined based on analysis of a plurality of dynamic facial patterns identified for a plurality of users.

9. The method of claim 1, wherein the at least one reference dynamic facial pattern is specifically defined for the user based on at least one previously captured dynamic facial pattern of the user.

10. The method of claim 1, wherein the at least one reference dynamic facial pattern is defined by at least one rule based model.

11. The method of claim 1, wherein the at least one reference dynamic facial pattern is learned by at least one model created using at least one Machine Learning (ML) model trained with a plurality of dynamic facial features of a plurality of users.

12. The method of claim 11, further comprising the comparison is done by applying the at least one trained ML model to:
    extract at least one feature vector from the at least some images, the at least one feature vector expresses movement of at least some of the plurality of wrinkles and/or of the other dynamic facial features, and
    classify the at least one extracted feature vector according to the at least one learned reference dynamic facial pattern.

13. The method of claim 1, further comprising illuminating the face of the user to accentuate the movement of the at least one dynamic facial feature of the user.

14. The method of claim 1, further comprising biometrically authenticating the user based on the at least one dynamic facial pattern compared to a biometric face signature of the user.

15. A system for determining whether a user engaged in an interactive video session is genuine, comprising:
    at least one processor configured to execute a code, the code comprising:
        code instruction to receive a sequence of consecutive images captured by at least one imaging sensor configured to depict at least a face of a user engaged in a video session while the user moves his lips;
        code instructions to instruct the user to say at least one word selected to stimulate an increased movement of at least one dynamic facial pattern of the user;
        code instruction to analyze at least some of the images of the sequence to identify the at least one dynamic facial pattern of the user while his lips are moving, the at least one dynamic facial pattern expressing a movement pattern of at least one of a plurality of wrinkles in the face of the user;

code instruction to determine whether the user is genuine or an impersonator based on a comparison between the at least one identified dynamic facial pattern of the user and at least one reference dynamic facial pattern; and code instruction to output an indication of whether the user is genuine or not based on the determination;

wherein the at least one selected word is directed to stimulate the user to smile and/or to laugh thus accentuating the movement of the at least one wrinkle.

16. A non-transitory computer readable storage medium comprising program instructions executable by a computer, which, when executed by the computer, cause the computer to perform a method according to claim 1.

* * * * *